United States Patent
Kuroda

(10) Patent No.: US 10,018,896 B2
(45) Date of Patent: Jul. 10, 2018

(54) PROJECTOR HAVING A NOTCH AND FITTING MECHANISM THEREIN

(71) Applicant: SEIKO EPSON CORPORATION, Tokyo (JP)

(72) Inventor: Akitoshi Kuroda, Yamagata-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/640,870

(22) Filed: Jul. 3, 2017

(65) Prior Publication Data

US 2018/0031955 A1    Feb. 1, 2018

(30) Foreign Application Priority Data

Jul. 27, 2016   (JP) ................. 2016-147089

(51) Int. Cl.
| G03B 21/14 | (2006.01) |
| G03B 21/16 | (2006.01) |
| G03B 33/12 | (2006.01) |
| G03B 21/00 | (2006.01) |

(52) U.S. Cl.
CPC ......... G03B 21/142 (2013.01); G03B 21/145 (2013.01); *G03B 21/006* (2013.01); *G03B 21/16* (2013.01); *G03B 33/12* (2013.01)

(58) Field of Classification Search
CPC .............................. G03B 21/53; G03B 21/14
See application file for complete search history.

(56) References Cited

U.S. PATENT DOCUMENTS

| 6,390,627 | B1 * | 5/2002 | Kuroda ................. | F16M 11/10 |
| | | | | 248/133 |
| 2011/0310364 | A1 * | 12/2011 | Wakabayashi ....... | G03B 21/142 |
| | | | | 353/101 |
| 2014/0160443 | A1 * | 6/2014 | Nakayama .............. | G03B 3/04 |
| | | | | 353/69 |

FOREIGN PATENT DOCUMENTS

JP       2004-020622 A     1/2004

* cited by examiner

*Primary Examiner* — Sultan Chowdhury
*Assistant Examiner* — Danell L Owens
(74) *Attorney, Agent, or Firm* — Oliff PLC

(57) ABSTRACT

A projector includes: an image light generating section generating image light; a projection lens projecting the image light emitted from the image light generating section; a lens shift mechanism moving the projection lens in a first direction orthogonal to an optical axis of the projection lens; an external housing accommodating the image light generating section and the lens shift mechanism and including an opening surrounding the projection lens; and a fitting mechanism attached to the external housing. The external housing includes a notch portion formed by cutting off a portion of the peripheral edge of the opening and located in the first direction with respect to the projection lens. The fitting mechanism includes a fitting portion fitted into the notch portion and forming a portion of the peripheral edge. The fitting portion moves away from the projection lens by being pressed from the projection lens side.

7 Claims, 7 Drawing Sheets

PROJECTOR HAVING A NOTCH AND FITTING MECHANISM THEREIN

CROSS REFERENCE TO RELATED APPLICATION

The entire disclosure of Japanese Patent Application No. 2016-147089, filed Jul. 27, 2016 is expressly incorporated by reference herein.

BACKGROUND

1. Technical Field

The present invention relates to a projector.

2. Related Art

A projector including a light source, a light modulator that modulates light emitted from the light source, a projection lens that projects the modulated light, and an external housing that accommodates these members has been known in the related art. Moreover, a projector including a lens shift mechanism that moves the projection lens so that the position of the projected image can be adjusted, in which the projection lens is movable in an opening of the external housing, has been known. In addition, a lens shift mechanism that stops the movement of the projection lens when a foreign object enters between the moving projection lens and the peripheral edge of the opening of the external housing has been proposed (e.g., see JP-A-2004-20622).

The lens shift mechanism disclosed in JP-A-2004-20622 includes a foreign object detecting portion and operation prohibiting means. The foreign object detecting portion is disposed so as to surround the movable region of the projection lens, and is configured so as to be electrically continuous due to an external force applied when the movement of the projection lens is inhibited by a foreign object. The operation prohibiting means stops the movement of the projection lens based on the electrical continuity of the foreign object detecting portion.

However, the lens shift mechanism disclosed in JP-A-2004-20622 has a problem in that since the lens shift mechanism includes the foreign object detecting portion and the operation prohibiting means, the device is complicated. Moreover, the technique disclosed in JP-A-2004-20622 has also a problem in that since the foreign object detecting portion is configured to be disposed in the opening, the opening and thus the projector are increased in size, or that since the size of the opening is restricted, the design of the projector is also restricted.

SUMMARY

An advantage of some aspects of the invention is to solve at least a part of the problems described above, and the invention can be implemented as the following forms or application examples.

Application Example 1

A projector according to this application example includes: an image light generating section generating image light, the image light generating section including a light source and a light modulator modulating light emitted from the light source; a projection lens projecting the image light emitted from the image light generating section; a lens shift mechanism moving the projection lens in a first direction crossing an optical axis of the projection lens; an external housing including an opening surrounding the projection lens; and a fitting mechanism attached to the external housing, wherein the external housing includes a notch portion formed by cutting off a portion of a peripheral edge located on the first direction side of the opening, the fitting mechanism includes a fitting portion fitted into the notch portion.

According to this configuration, the projection lens is configured to be movable in the opening of the external housing. The notch portion is provided in the peripheral edge of the opening in the first direction in which the projection lens moves, and the fitting portion is fitted into the notch portion. In the case where a foreign object enters between the projection lens and the fitting portion (the peripheral edge of the opening) when the projection lens is moved in a direction approaching the fitting portion from a distant position, even if the foreign object is interposed temporarily, the fitting portion is pressed via the foreign object and moves away from the projection lens. Therefore, the foreign object is not compressed, and it is possible to move the projection lens. Thus, it is possible to reduce the size of the projector in the first direction in which the projector can move an image to be projected, or to improve designability because a limitation on the size of the opening is relaxed. Here, the foreign object is not limited to an object but includes the user's finger or the like that handles the projector.

Application Example 2

In the projector according to the application example, it is preferable that the fitting mechanism includes a moving portion and a biasing portion, that the moving portion includes a projected state where the moving portion projects from any one of the notch portion and the fitting portion and can engage with the other, and a retracted state where the moving portion has a projection amount smaller than that in the projected state and is released from engagement with respect to the other, and that the moving portion engages with the other against a biasing force of the biasing portion such that the moving portion transitions to the retracted state with pressure on the fitting portion from the projection lens side.

According to this configuration, the fitting mechanism includes the moving portion and the biasing portion in addition to the fitting portion. The moving portion is configured such that the moving portion projects from any one of the notch portion and the fitting portion by being biased by the biasing portion and can engage with the other. Moreover, the moving portion engages with the other such that the moving portion transitions to the retracted state with pressure on the fitting portion from the projection lens side. With this configuration, it is possible with a simple configuration to realize a fitted state where the fitting portion is fitted into the notch portion and a released state where the fitting of the fitting portion with respect to the notch portion is released.

Application Example 3

In the projector according to the application example, it is preferable that the notch portion includes a pair of facing end portions facing each other in a state where the fitting of the fitting portion is released, that the fitting portion includes a pair of side end portions respectively facing the pair of facing end portions in a state where the fitting portion is fitted into the notch portion, that a pair of the moving portions are provided so as to be able to respectively project from either the pair of facing end portions or the pair of side end portions, and that the biasing portion causes the pair of the moving portions to respectively project from the pair of side end portions.

According to this configuration, since the fitting portion is supported at the both sides by the notch portion via the moving portions, the fitting portion can be highly precisely disposed into the notch portion or can be moved with a stable pressing force. Thus, even with a configuration in which the peripheral edge of the opening is formed of the external housing and the fitting portion, the peripheral edge of the opening can be formed without impairing the external appearance, or a configuration in which the fitting portion transitions from the fitted state to the released state with a stable pressing force is possible.

Application Example 4

In the projector according to the application example, it is preferable that the fitting portion is detached from the notch portion by being pressed from the projection lens side in the state where the fitting portion is fitted into the notch portion.

According to this configuration, since the fitting portion is detached from the external housing when pressed from the projection lens side, it is possible to reliably prevent the interposing of a foreign object between the projection lens and the fitting portion.

Application Example 5

In the projector according to the application example, it is preferable that the fitting portion is fitted into the notch portion by being slid in a direction from the side to which the projection lens projects the image light toward the projection lens side in a state where the fitting portion is detached with respect to the external housing.

According to this configuration, the fitting portion can be easily fitted into the notch portion without changing the attitude of the projector.

Application Example 6

In the projector according to the application example, it is preferable that the notch portion includes a central axis extending in a second direction in which the pair of facing end portions face each other, and that the fitting portion is pivoted to the notch portion so as to be rotatable about the central axis.

According to this configuration, the user can easily bring the fitting portion into the fitted state by pressing the fitting portion to the projection lens side in the released state. Thus, it is possible to transition the released state to the fitted state with a simpler operation while realizing a configuration in which a foreign object is not interposed between the projection lens and the fitting portion. Moreover, since the fitting portion is not separated from the external housing in the released state, it is possible to improve the handleability of the fitting portion itself or to prevent the loss thereof.

Application Example 7

In the projector according to the application example, it is preferable that the external housing includes a locking portion that locks the fitting portion in a direction toward the projection lens side in a state where the fitting portion is fitted into the notch portion.

According to this configuration, since the external housing is provided with the locking portion described above, the movement of the fitting portion is restricted even when the fitting portion is pressed to the projection lens side in the state of being fitted into the notch portion. Thus, even when the projector is handled with the user's finger or the like hooking on the fitting portion as a portion of the peripheral edge of the opening, the state where the fitting portion is fitted into the notch portion is maintained. Thus, even with a configuration in which the fitting portion is disposed in a portion of the peripheral edge of the opening, it is possible to provide the projector whose handling is not impaired.

Application Example 8

In the projector according to the application example, it is preferable that the projector has a predetermined attitude in which the projector projects a rectangular image as a landscape-oriented image with a direction along a short side of the rectangular image being an up-down direction, that the first direction is the up-down direction in the predetermined attitude, and that the notch portion is formed below the projection lens in the predetermined attitude.

According to this configuration, the projector projects the landscape-oriented image in, for example, an attitude in which the projector is placed on a desk or the like, as the predetermined attitude. The notch portion, that is, the fitting portion is provided below the projection lens in the predetermined attitude. In the predetermined attitude, a location below the projection lens is hard to see from the outside of the projector, and the fitting portion is disposed at the hard-to-see location. With this configuration, the projection lens can be moved downward without interposing a foreign object with no need to thoroughly check the location below the projection lens. Thus, it is possible to provide the projector that allows the user to readily operate the lens shift mechanism.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to an embodiment will be described with reference to the drawings.

The projector of the embodiment modulates light emitted from a light source in response to image information, and projects an image on a projection surface such as a screen. Moreover, the projector of the embodiment includes a lens shift mechanism, and is configured so as to be able to move the image projected on the projection surface.

Main Configuration of Projector

Figure 1:
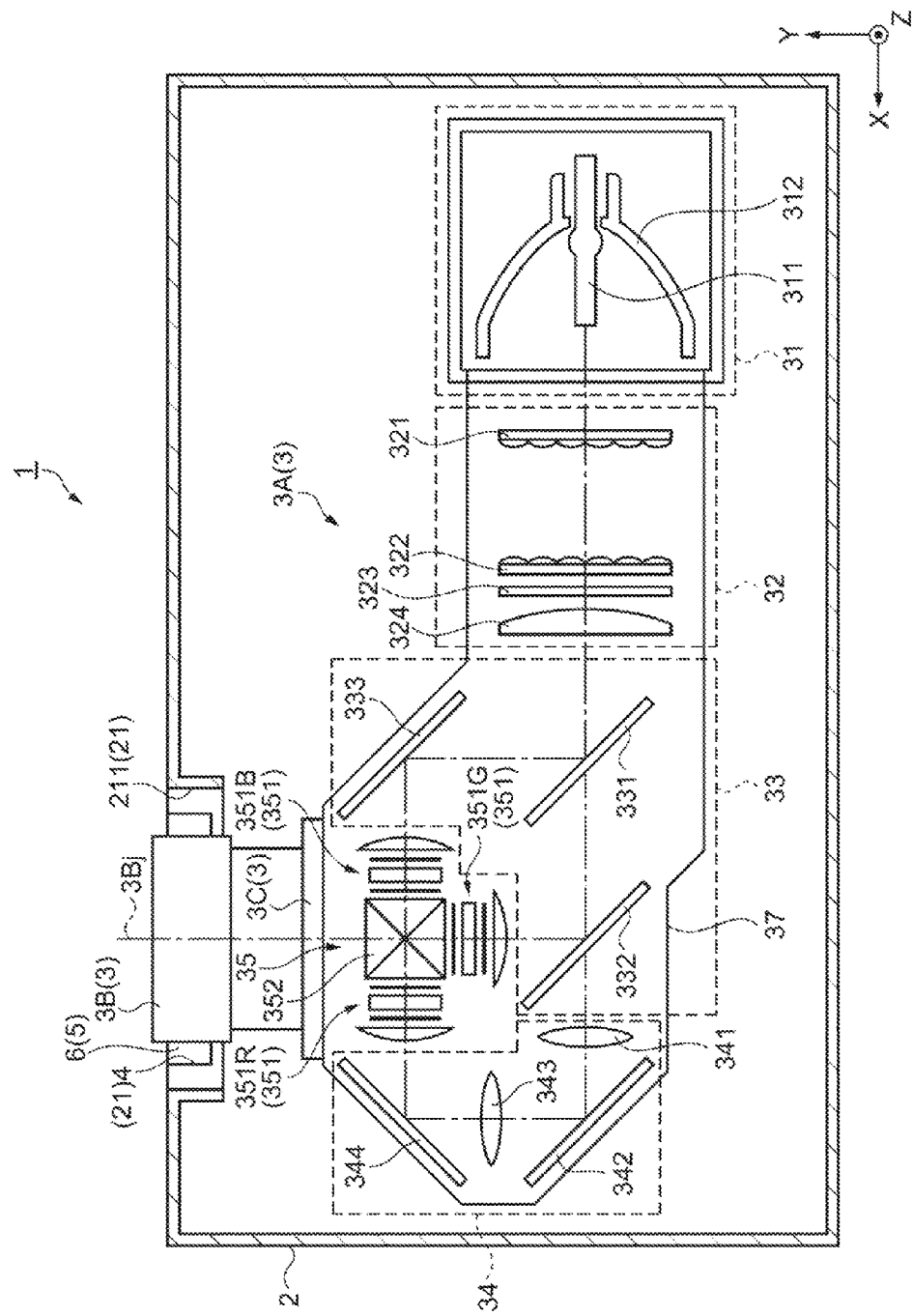
FIG. 1 is a schematic view showing a schematic configuration of a projector of an embodiment.

FIG. 1 is a schematic view showing a schematic configuration of the projector 1 of the embodiment.

As shown in FIG. 1, the projector 1 includes an external housing 2 constituting the exterior, a control section (not shown), an optical unit 3 including a light source 311, and a fitting mechanism 5. Although not shown in the drawing, a power source device that supplies power to the light source 311, the control section, and the like, a cooling device that cools the optical unit 3 and the like, for example, are further disposed inside the external housing 2. In the following description, for convenience of the description, the direction of light emitted from the projector 1 is defined as front (+Y-direction), the upper side in the vertical direction in the projector 1 placed on a desk or the like is defined as top (+Z-direction), and the left side of the projector 1 as viewed from the back is defined as left (+X-direction).

Figure 2:
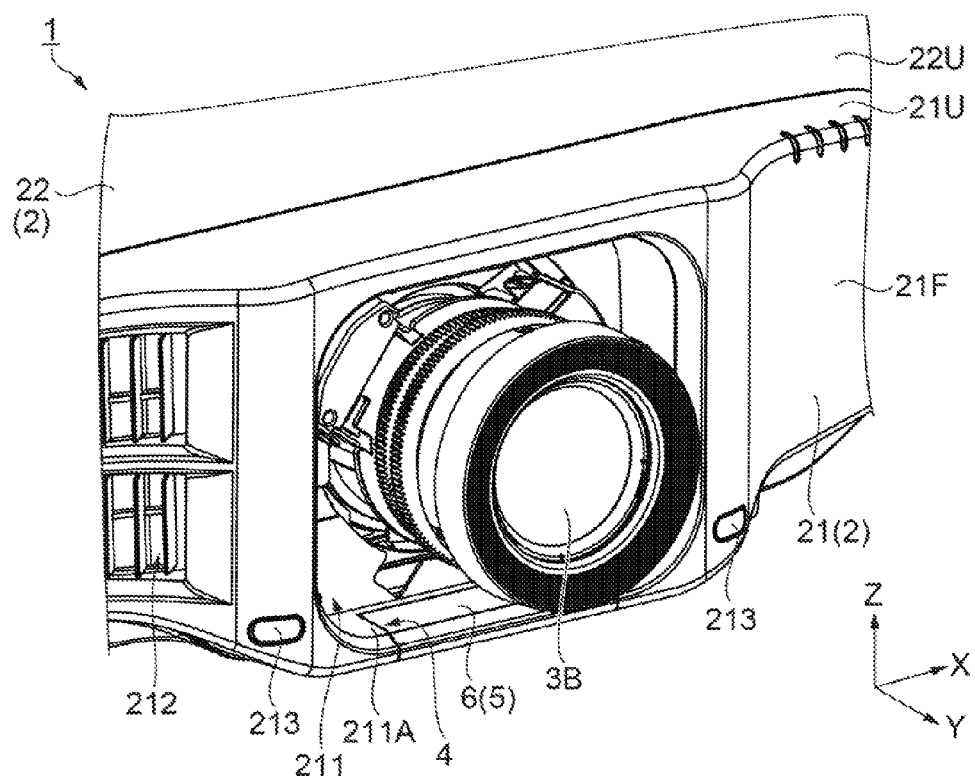
FIG. 2 is a perspective view showing the front side of the projector of the embodiment.

FIG. 2 is a perspective view showing the front side of the projector 1.

As shown in FIG. 2, the external housing 2 includes a front case 21 that forms the front side, an upper case 22 that forms the upper side, and a lower case (not shown) that forms the lower side. These members are fixed together with screws or the like.

The front case 21 includes a front surface 21F, an upper surface 21U, and a lower surface 21D (see FIG. 5), which serve as outer surfaces. The front surface 21F is provided with an opening 211, an exhaust port 212, and two remote-controller light receiving windows 213.

The opening 211 includes an inner surface 211A and surrounds the distal end side (light exiting side) of a later-described projection lens 3B of the optical unit 3.

The exhaust port 212 is provided on the −X-side of the opening 211. The warmed air inside the external housing 2 is discharged through the exhaust port 212 by an exhaust fan included in the cooling device.

The two remote-controller light receiving windows 213 are provided close to the lower case in the vicinity of the opening 211, and are each formed of a filter member that transmits infrared rays. In the front case 21, a remote-controller light receiving section (not shown) connected to the control section is disposed on the inside of the remote-controller light receiving window 213.

Moreover, the front case 21 includes a notch portion 4 formed by cutting off a portion of the peripheral edge of the opening 211. Although described in detail later, the notch portion 4 is formed below the projection lens 3B and cut off so as to be opened on the front side (+Y-side).

Although not described in detail, the upper case 22 includes an upper surface 22U along the upper surface 21U of the front case 21. An operation panel is disposed on the upper surface 22U. Various kinds of settings or operations of the projector 1 are conducted through operating of the operation panel or remote controlling by a remote controller.

Although not described in detail, the lower case includes a lower surface (not shown) along the lower surface 21D (see FIG. 5) of the front case 21. Leg portions (not shown) that support the external housing 2 are disposed to project from the lower surface. The projector 1 has a predetermined attitude in which the projector is placed on a desk or the like, and is disposed with the leg portions abutting on the desk in the predetermined attitude.

Moreover, although not shown in the drawing, an inlet port for taking in external air is formed in the external housing 2, and a filter member for preventing the entry of dust mixed in the external air is disposed on the inside of the inlet port.

The control section includes a central processing unit (CPU), a read only memory (ROM), and a random access memory (RAM), and functions as a computer. The control section performs control of the operation of the projector 1, for example, control related to projection of an image.

Under the control of the control section, the optical unit 3 optically processes the light emitted from the light source 311 and projects the processed light.

The optical unit 3 is accommodated in the external housing 2, and includes an image light generating section 3A, the projection lens 3B, and a lens shift mechanism 3C as shown in FIG. 1.

The image light generating section 3A includes a light source device 31, an integrator illumination optical system 32, a color separating optical system 33, a relay optical system 34, an optical device 35, and an optical component housing 37 in which these optical components are disposed at predetermined positions on the optical path.

The light source device 31 includes the light source 311 of discharge type composed of an extra-high-pressure mercury lamp, a metal halide lamp, or the like, and a reflector 312. The light source device 31 reflects the light emitted from the light source 311 with the reflector 312, and emits the light toward the integrator illumination optical system 32.

The integrator illumination optical system 32 includes a first lens array 321, a second lens array 322, a polarization conversion element 323, and a superimposing lens 324. The first lens array 321, the second lens array 322, and the superimposing lens 324 divide the light emitted from the light source device 31 into a plurality of partial lights, and substantially superimpose the partial lights on the surfaces of liquid crystal panels to be described later. The polarization conversion element 323 converts random light emitted from the second lens array 322 to linearly polarized light that can be used by the liquid crystal panels.

The color separating optical system 33 includes two dichroic mirrors 331 and 332 and a reflection mirror 333, and separates the light emitted from the integrator illumination optical system 32 into three color lights: red light (hereinafter referred to as "R light"), green light (hereinafter referred to as "G light"), and blue light (hereinafter referred to as "B light").

The relay optical system 34 includes an incident-side lens 341, a relay lens 343, and reflection mirrors 342 and 344, and has the function of directing the R light separated by the color separating optical system 33 to a light modulator 351 for R light. Although the optical unit 3 is configured such that the relay optical system 34 directs the R light, the optical unit 3 is not limited to this configuration. For example, the relay optical system 34 may direct the B light.

The optical device 35 includes light modulators 351 provided for the respective color lights (the light modulator 351 for R light is denoted by 351R, the light modulator 351 for G light is denoted by 351G, and the light modulator 351 for B light is denoted by 351B) and a cross dichroic prism 352 as a color combining optical device. The optical device 35 modulates the respective color lights separated by the color separating optical system 33 in response to image information, and combines the modulated color lights.

Each of the light modulators 351 includes a transmissive liquid crystal panel, an incident-side polarizer disposed on the light incident side of the liquid crystal panel, and an exiting-side polarizer disposed on the light exiting side of the liquid crystal panel.

The liquid crystal panel includes a rectangular pixel region where micro pixels (not shown) are formed in a matrix. Each of the pixels of the liquid crystal panel is set to a light transmittance in response to a display image signal, so that the light modulator 351 forms a display image in the pixel region. Then, the respective color lights separated by the color separating optical system 33 are modulated by the light modulators 351 and thereafter emitted to the cross dichroic prism 352.

The cross dichroic prism 352 has a substantially square shape, in a plan view, formed of four right-angle prisms bonded together. Two dielectric multilayer films are formed at interfaces between the right-angle prisms bonded together. The cross dichroic prism 352 reflects the color lights modulated by the light modulators 351R and 351B while transmitting the color light modulated by the light modulator 351G, to combine the color lights, and emits the combined light as image light. In this manner, the image light generating section 3A generates the image light.

The projection lens 3B includes a plurality of lenses disposed along an optical axis 3Bj, and enlarges and projects the image light emitted from the cross dichroic prism 352 onto a screen or the like. Moreover, the projector 1 projects, in the predetermined attitude, a rectangular landscape-oriented image whose size in the left-right direction is larger than that in the up-down direction. That is, in the rectangular image projected in the predetermined attitude, a direction along the short side of the rectangular image is the up-down direction. The optical axis 3Bj is along the Y-direction.

Although not described in detail, the lens shift mechanism 3C includes a head body attached to the optical component housing 37, a moving member that holds the projection lens 3B and is movably supported to the head body, and an electric drive mechanism that moves the moving member. The lens shift mechanism 3C moves the projection lens 3B in a direction orthogonal to the optical axis 3Bj in response to an operation through the operation panel or the remote controller. The lens shift mechanism 3C of the embodiment is configured so as to be able to move the projection lens 3B in two directions (the X-direction and the Z-direction). The Z-direction corresponds to a first direction, and the X-direction corresponds to a second direction.

The fitting mechanism 5 includes a fitting portion 6 that is fitted into the notch portion 4 of the front case 21, and is attached to the front case 21. When the fitting portion 6 is pressed from the projection lens 3B side, the fitting with respect to the notch portion 4 is released and thus the fitting portion 6 moves away from the projection lens 3B. In the embodiment, the fitting portion 6 is configured so as to be detached from the notch portion 4 when the fitting portion 6 is pressed from the projection lens 3B side.

Figure 3:
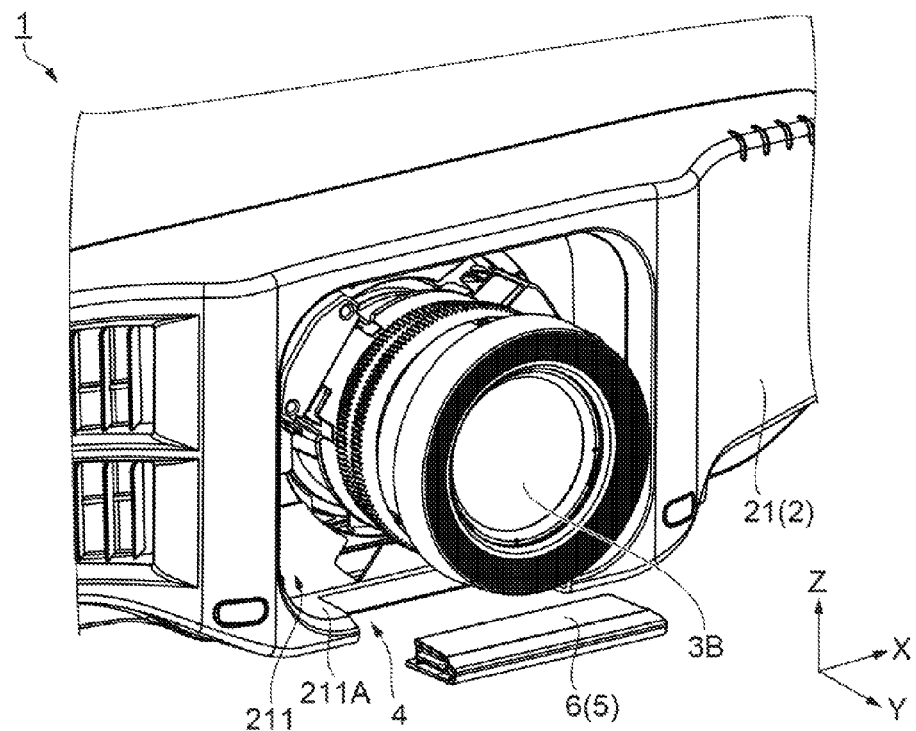
FIG. 3 is a perspective view showing the front side of the projector of the embodiment, showing a state where a fitting portion is detached from a notch portion.

FIG. 3 is a perspective view showing the front side of the projector 1, showing the state where the fitting portion 6 is detached from the notch portion 4.

The fitting portion 6 is configured so as to be fitted into the notch portion 4 by being slid in a direction from the front of the front case 21, that is, from the side to which the projection lens 3B projects the image light toward the projection lens 3B in the state where the fitting portion 6 is detached from the front case 21. When the fitting portion 6 is fitted into the notch portion 4, the fitting portion 6 forms a portion of the peripheral edge of the opening 211. Hereinafter, the state where the fitting portion 6 is fitted into the notch portion 4 is referred to as "fitted state", and the state where the fitting with respect to the notch portion 4 is released by moving the fitting portion 6 is referred to as "released state".

Configuration of Fitting Mechanism

Here, the fitting mechanism 5 will be described in detail.

First, the notch portion 4 of the front case 21 will be described in detail.

As shown in FIG. 3, the notch portion 4 is formed below the projection lens 3B, that is, in the −Z-direction (first direction), with respect to the projection lens 3B, of the directions in which the projection lens 3B can move.

Figure 4:
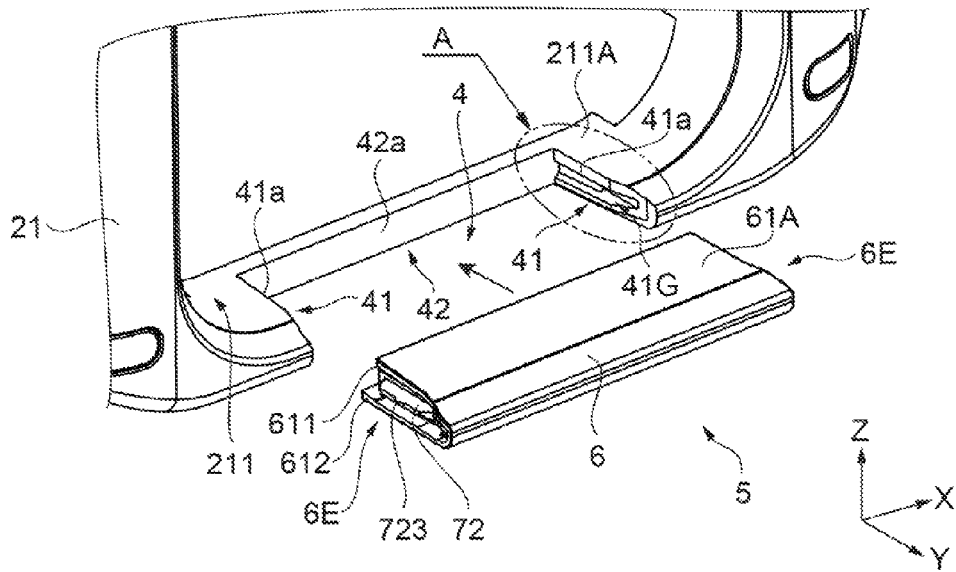
FIG. 4 is a perspective view of the notch portion and a fitting mechanism in a released state of the embodiment as viewed obliquely from the front top.
Figure 5:
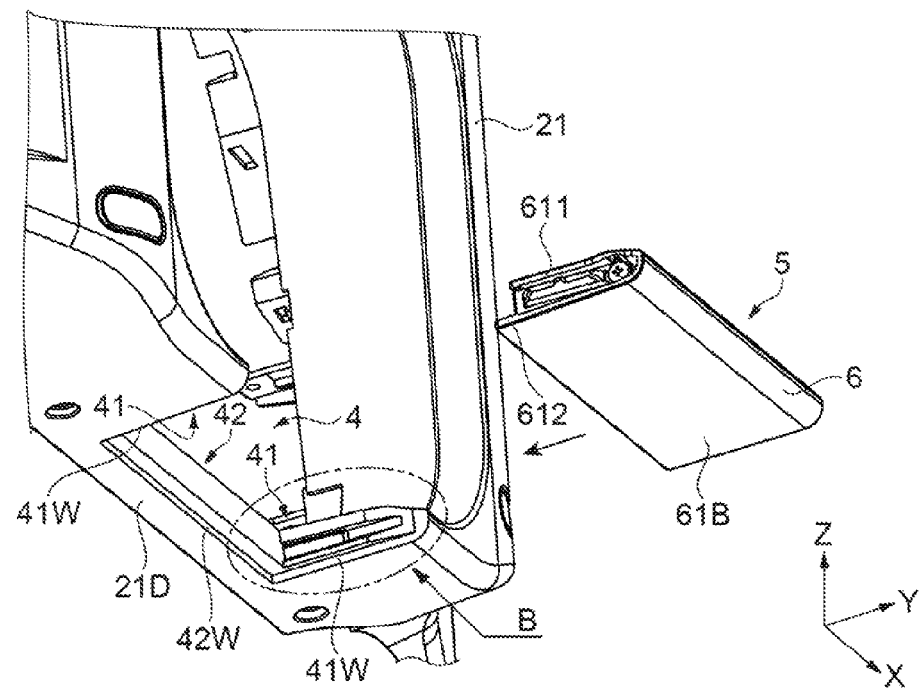
FIG. 5 is a perspective view of the notch portion and the fitting mechanism in the released state of the embodiment as viewed obliquely from the front bottom.

FIG. 4 is a perspective view of the notch portion 4 and the fitting mechanism 5 in the released state as viewed obliquely from the front top. FIG. 5 is a perspective view of the notch portion 4 and the fitting mechanism 5 in the released state as viewed obliquely from the front bottom.

As shown in FIGS. 4 and 5, the notch portion 4 is formed in a rectangular shape that is longer in the X-direction than in the Y-direction. The notch portion 4 includes a pair of facing end portions 41 facing each other in the X-direction (second direction) in the released state and an inner end portion 42 connected to end portions (end portions on the depth side in the notch portion 4) of the pair of facing end portions 41 on the −Y-side.

The pair of facing end portions 41 have a bilaterally symmetrical shape. Herein, the description will focus on the facing end portion 41 on the +X-side.

Figure 6:
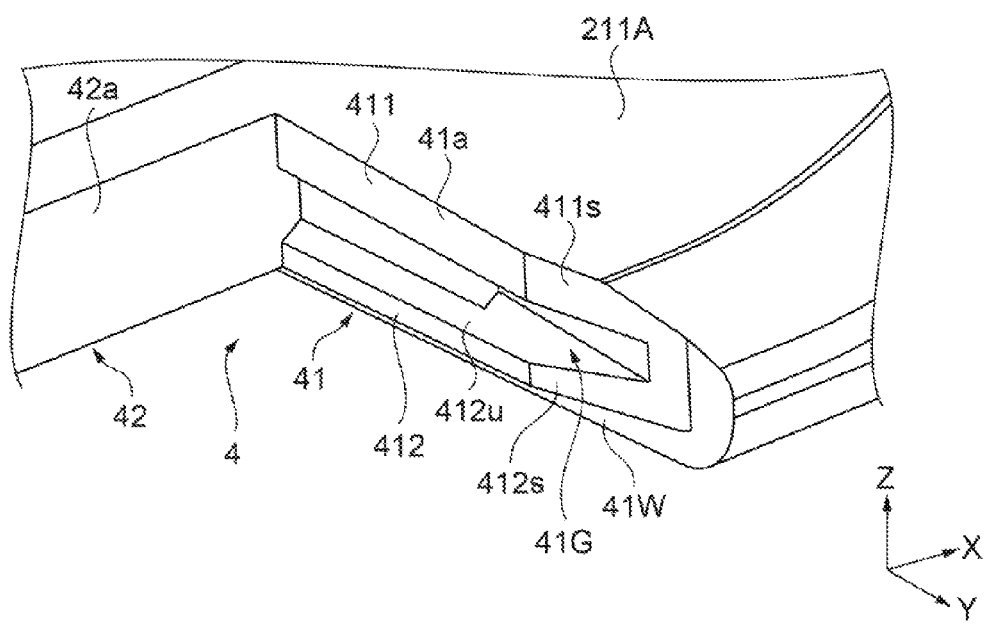
FIG. 6 is a perspective view showing a facing end portion of the embodiment, representing an enlarged view of a portion A in FIG. 4.
Figure 7:
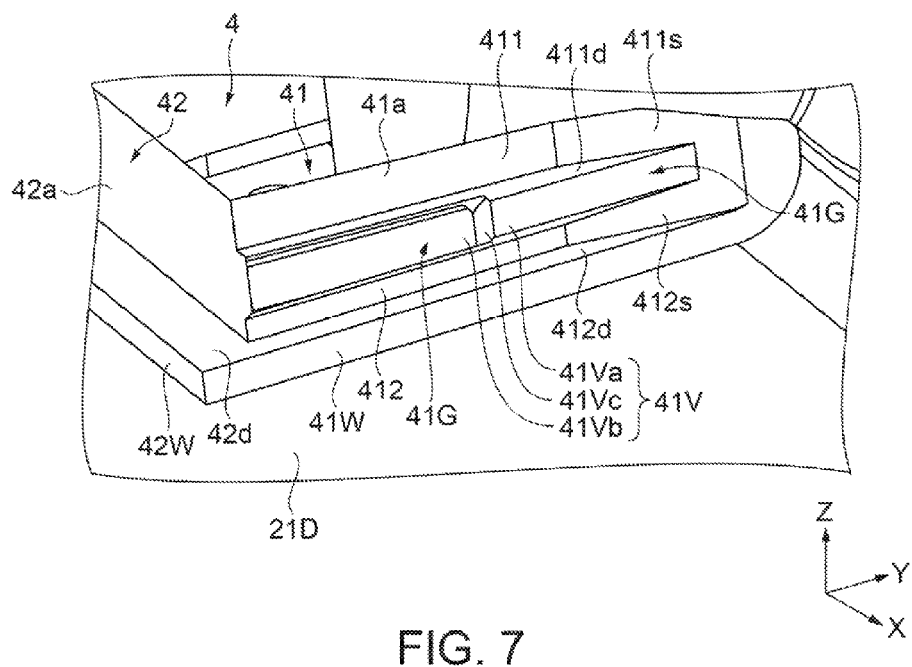
FIG. 7 is a perspective view showing the facing end portion of the embodiment, representing an enlarged view of a portion B in FIG. 5.

FIG. 6 is a perspective view showing the facing end portion 41 on the +X-side, representing an enlarged view of a portion A in FIG. 4. FIG. 7 is a perspective view showing the facing end portion 41 on the +X-side, representing an enlarged view of a portion B in FIG. 5.

As shown in FIGS. 6 and 7, the facing end portion 41 includes a first projecting portion 411 and a second projecting portion 412, which extend along the Y-direction with a predetermined distance therebetween, and a guide groove 41G formed between the first projecting portion 411 and the second projecting portion 412.

The first projecting portion 411 extends to the inner end portion 42, and includes an end surface 41a, a lower surface 411d, and an inclined surface 411s, which cross the inner surface 211A.

The lower surface 411d is a plane substantially along the X-Y plane. The inclined surface 411s is provided on the distal end side (end portion side on the +Y-side) of the first projecting portion 411, and is inclined so as to be closer to the +X-side toward the +Y-side.

The second projecting portion 412 is formed below the first projecting portion 411 and extends to the inner end portion 42. The second projecting portion 412 includes a guide slope 412u, a lower surface 412d, and an inclined surface 412s.

The guide slope 412u is a surface of the second projecting portion 412 on the upper side and faces the lower surface 411d of the first projecting portion 411. The guide slope 412u is inclined so as to be located downward toward the facing end portion 41 (the facing end portion 41 on the −X-side) on the opposite side. The lower surface 412d is a surface of the second projecting portion 412 on the lower side. As shown in FIG. 7, the lower surface 412d is formed recessed from the outer surface (the lower surface 21D) of the front case 21, and is a plane substantially along the X-Y plane. That is, a step 41W is formed between the lower surface 21D and the second projecting portion 412. The inclined surface 412s is inclined along the inclined surface 411s of the first projecting portion 411.

The guide groove 41G is formed of the lower surface 411d of the first projecting portion 411, the guide slope 412u of the second projecting portion 412, and a bottom surface 41V.

As shown in FIG. 7, the bottom surface 41V includes a front-side bottom surface 41Va, a rear-side bottom surface 41Vb, and an inclined surface 41Vc.

The front-side bottom surface 41Va is formed on the distal end side (+Y-side) of the guide groove 41G. The rear-side bottom surface 41Vb is provided on the inner end portion 42 side (−Y-side) of the front-side bottom surface 41Va and recessed from the front-side bottom surface 41Va. The inclined surface 41Vc connects the front-side bottom surface 41Va with the rear-side bottom surface 41Vb and is inclined with respect to the Y-Z plane.

As shown in FIG. 7, the inner end portion 42 includes an end surface 42a crossing the inner surface 211A and the end surface 41a, and a step 42W formed on the lower side of the end surface 42a, recessed from the end surface 42a and the lower surface 21D, and connected to the step 41W. The step 42W includes a lower surface 42d connected to the lower surface 412d. The lower surfaces 412d and 42d correspond to a locking portion.

Next, the fitting mechanism 5 will be described.

The fitting mechanism 5 is formed to be bilaterally symmetrical similarly to the pair of facing end portions 41, and is configured so as to be able to engage with the notch portion 4.

Figure 8:
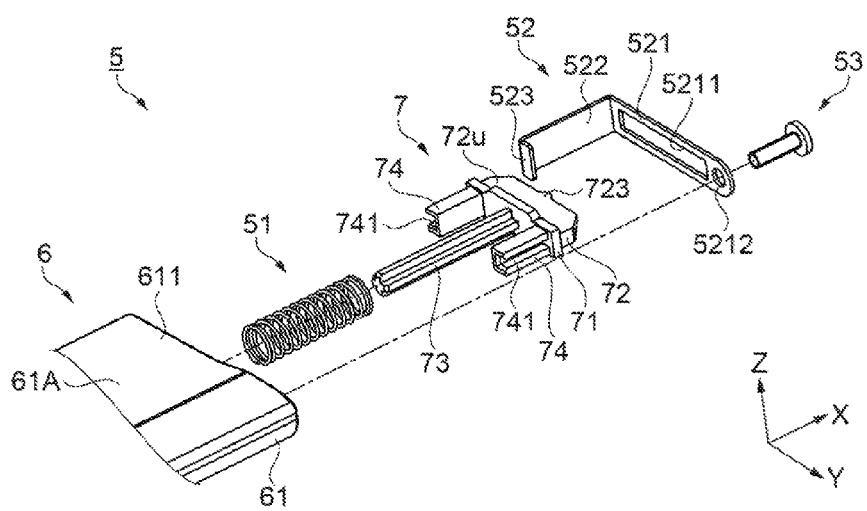
FIG. 8 is an exploded perspective view of the fitting mechanism of the embodiment as viewed obliquely from the −X-side top.
Figure 9:
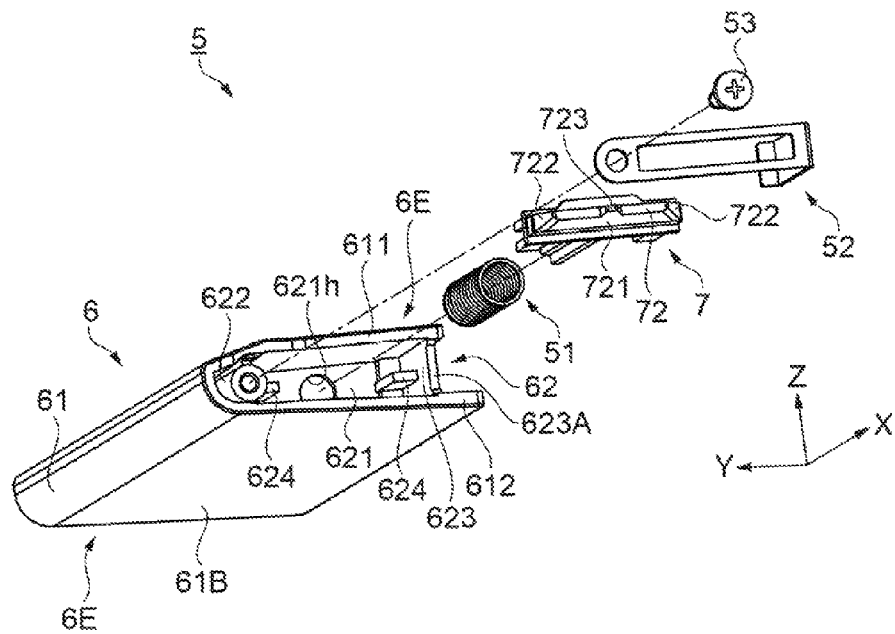
FIG. 9 is an exploded perspective view of the fitting mechanism of the embodiment as viewed obliquely from the +X-side bottom.

FIG. 8 is an exploded perspective view of the +X-side (left side) of the fitting mechanism 5 as viewed obliquely from the −X-side top. FIG. 9 is an exploded perspective view of the +X-side of the fitting mechanism 5 as viewed obliquely from the +X-side bottom.

As shown in FIGS. 8 and 9, the fitting mechanism 5 includes, in addition to the fitting portion 6, a moving portion 7, a coil spring 51 as a biasing portion, a restricting plate 52, and a screw 53. The moving portion 7, the coil spring 51, the restricting plate 52, and the screw 53 are disposed on each of the left and right sides of the fitting portion 6.

Figure 10:
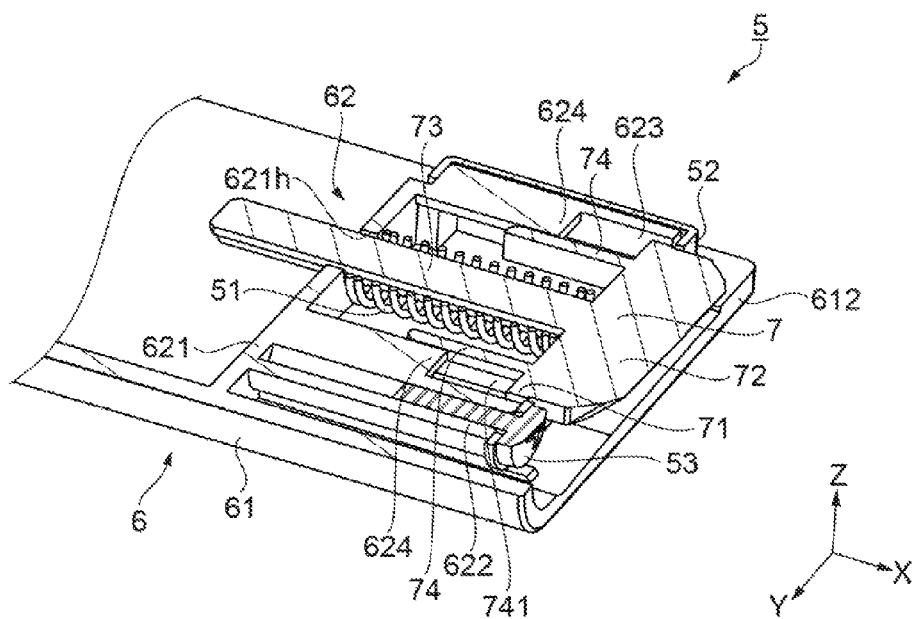
FIG. 10 is a cross-sectional view of the fitting mechanism of the embodiment.

FIG. 10 is a cross-sectional view of the +X-side of the fitting mechanism 5.

The fitting portion 6 is made of synthetic resin and includes an external appearance portion 61 and member attaching portions 62 as shown in FIGS. 9 and 10.

The external appearance portion 61 is formed in a rectangular shape in a plan view so as to be able to be fitted into the notch portion 4. The external appearance portion 61 includes an upper-surface forming portion 611 (see FIG. 8) and a lower-surface forming portion 612 (see FIG. 9), and is formed in a U-shape in cross-section at the Y-Z plane. The upper-surface forming portion 611 includes an upper surface 61A along the inner surface 211A of the front case 21 in the fitted state. The lower-surface forming portion 612 includes a lower surface 61B along the lower surface 21D of the front case 21 in the fitted state. The external appearance portion 61 is formed such that the upper-surface forming portion 611 is inserted into a region surrounded by the end surfaces 41a and 42a (see FIG. 4) of the notch portion 4 and that the lower-surface forming portion 612 is fitted to the steps 41W and 42W (see FIG. 5).

The member attaching portions 62 are respectively provided at the left and right end portions of the fitting portion 6. The left and right end portions (side end portions 6E, see FIG. 9) including the member attaching portions 62 in the fitting portion 6 respectively face the facing end portions 41 of the notch portion 4 in the fitted state.

Herein, the description will focus on the member attaching portion 62 on the +X-side.

As shown in FIGS. 9 and 10, the member attaching portion 62 includes a base portion 621 connecting the upper-surface forming portion 611 with the lower-surface forming portion 612, a boss 622 projecting from the base portion 621 to the +X-side, a restricting-plate receiving portion 623, and a pair of guide ribs 624.

The base portion 621 is formed in a plate shape and includes a round hole 621h formed in the center.

The boss 622 is provided on the distal end side (in the vicinity of the end portion on the +Y-side) of the fitting portion 6, has a cylindrical shape, and includes a screw hole formed in the center.

The restricting-plate receiving portion 623 is provided on the side (in the vicinity of the end portion of the fitting portion 6 on the −Y-side) of the round hole 621h opposite to the boss 622, and is formed in a plate shape along the X-Z plane. As shown in FIG. 9, an end surface 623A recessed to the same height (height in the X-direction) as the end surface of the boss 622 is formed at the end portion of the restricting-plate receiving portion 623 on the +Z-side.

The pair of guide ribs 624 are each formed in a plate shape and project toward each other respectively from the boss 622 and the restricting-plate receiving portion 623. Moreover, the pair of guide ribs 624 are formed at a predetermined spaced interval.

Next, the moving portion 7, the coil spring 51, the restricting plate 52, and the screw 53 will be described focusing on the members disposed on the +X-side of the fitting portion 6.

The moving portion 7 is configured so as to be biased by the coil spring 51 and able to move in the X-direction.

As shown in FIGS. 8 and 10, the moving portion 7 includes a base 71, an engaging portion 72, a first guide portion 73, and a pair of second guide portions 74.

The base 71 can be inserted between the upper-surface forming portion 611 and the lower-surface forming portion 612, and is formed in a rectangular shape, in a plan view, that is longer in the Y-direction than in the Z-direction.

As shown in FIGS. 8 and 9, the engaging portion 72 projects from the inside of the peripheral edge of the base 71 on the +X-side, and is formed to be able to be inserted into the guide groove 41G (see FIG. 4) of the facing end portion 41.

The engaging portion 72 includes an upper surface 72u, a guided slope 721, slopes 722, and a projection 723.

The upper surface 72u is a surface of the engaging portion 72 on the upper side, and is formed along the X-Y plane. The guided slope 721 is provided on the distal end side (+X-side) of a surface of the engaging portion 72 on the lower side, and is inclined so as to be located upward (+Z-side) toward the distal end. The slopes 722 are provided on the +Y-side and −Y-side of the distal end portion of the engaging portion 72. The projection 723 is provided at the center of the distal end of the engaging portion 72, is formed in a semicircular shape in a plan view, and includes surfaces respectively along the upper surface 72u and the guided slope 721.

The first guide portion 73 projects from the central portion of the base 71 to the −X-side, and is formed so as to be inserted through the round hole 621h of the base portion 621 as shown in FIG. 10.

The pair of second guide portions 74 project from the base 71 to the −X-side, and are provided on both sides of the first guide portion 73 in the Y-direction. Moreover, the pair of second guide portions 74 are formed such that the projection amount thereof from the base 71 is smaller than the projection amount of the first guide portion 73. The pair of second guide portions 74 are formed so as to be symmetrical to each other. As shown in FIG. 10, grooves 741 through which the pair of guide ribs 624 are respectively inserted are formed on the side of the pair of second guide portions 74 opposite to the first guide portion 73.

The coil spring 51 is formed to have an inside diameter larger than the inside diameter of the round hole 621h of the base portion 621, and is disposed between the base portion 621 and the base 71 of the moving portion 7 as shown in FIG. 10. The coil spring 51 biases the moving portion 7 to cause the distal end of the engaging portion 72 to project from the fitting portion 6 (the side end portion 6E).

The restricting plate 52 is formed of a sheet metal by press working, and abuts on the moving portion 7 biased by the coil spring 51 to restrict a predetermined amount or more of movement of the moving portion 7 to the +X-side.

As shown in FIG. 8, the restricting plate 52 includes a main body portion 521, a connecting portion 522, and a hooking portion 523.

The main body portion 521 is formed in a rectangular shape, in a plan view, that can be inserted between the upper-surface forming portion 611 and the lower-surface forming portion 612. A rectangular square hole 5211 and a round hole 5212 are formed in the main body portion 521.

The square hole 5211 is formed in a size that allows the engaging portion 72 of the moving portion 7 to be inserted therethrough and allows the base 71 to abut thereon. The round hole 5212 is provided on the +Y-side of the square hole 5211, and is formed at a position corresponding to the boss 622 of the fitting portion 6.

The connecting portion 522 is bent to the −X-side from the end portion of the main body portion 521 on the −Y-side. The hooking portion 523 is bent to the +Y-side from the end portion of the connecting portion 522 on the −X-side, and is formed so as to be hooked on the end portion of the restricting-plate receiving portion 623 on the −X-side as shown in FIG. 10.

The restricting plate 52 is fixed to the member attaching portion 62 as follows: the engaging portion 72 of the moving portion 7 is inserted into the square hole 5211; the hooking portion 523 is hooked on the restricting-plate receiving portion 623; the main body portion 521 is placed on the boss 622 and the end surface 623A; and then the screw 53 inserted through the round hole 5212 is inserted into the screw hole of the boss 622.

As shown in FIG. 4, the moving portion 7 in the fitting mechanism 5 is disposed with the distal end side of the engaging portion 72 protruding from the fitting portion 6 in the released state, and thus is brought into a projected state where the moving portion 7 can engage with the notch portion 4. Moreover, the moving portion 7 is configured such that when a force against the biasing force of the coil spring 51 is applied, the moving portion 7 moves so as to reduce the protrusion amount from the side end portion 6E and thus can be brought into a retracted state where the engagement with respect to the notch portion 4 is released.

As shown in FIGS. 4 and 5, the fitting portion 6 (the fitting mechanism 5) is fitted into the notch portion 4 by being slid from the front of the front case 21. Specifically, the fitting portion 6 (the fitting mechanism 5) is pressed in the −Y-direction with the engaging portions 72 of the moving portions 7 on the left and right sides inserted into the guide grooves 41G of the notch portion 4. Since the slopes 722 (see FIG. 9) are formed on the engaging portion 72, the moving portion 7 smoothly moves so as to reduce the protrusion amount from the side end portion 6E with the fitting portion 6 (the fitting mechanism 5) pressed in the −Y-direction. Then, when the fitting portion 6 (the fitting mechanism 5) is slid until the end portion of the external appearance portion 61 on the −Y-side abuts on the inner end portion 42 of the notch portion 4, the fitting portion 6 (the fitting mechanism 5) is brought into the fitted state where the fitting portion 6 (the fitting mechanism 5) is fitted into the notch portion 4.

Figure 11:
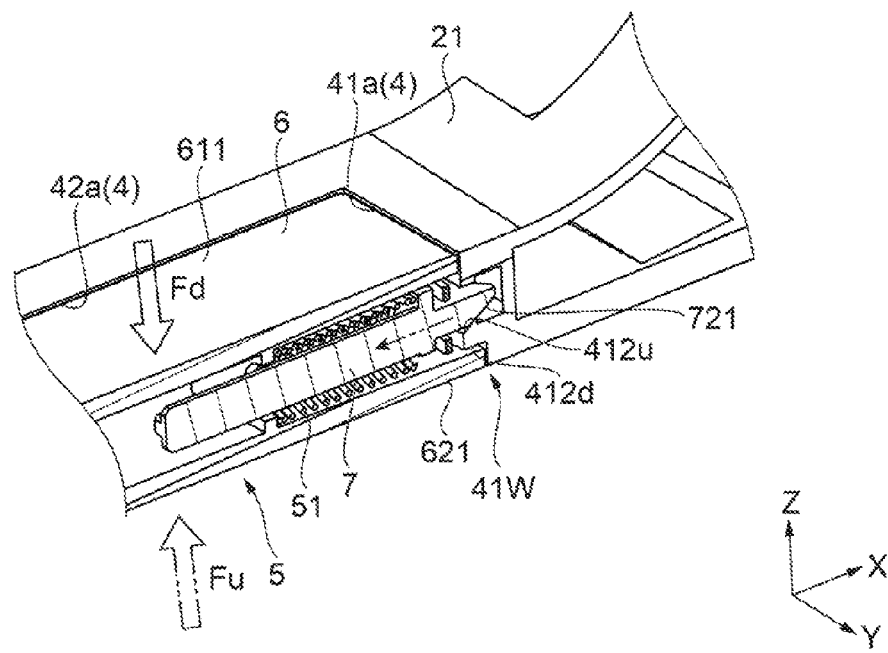
FIG. 11 is a cross-sectional perspective view showing the fitting mechanism in a fitted state and a portion of a front case of the embodiment.

FIG. 11 is a cross-sectional perspective view showing the fitting mechanism 5 in the fitted state and a portion of the front case 21.

In the fitted state, as shown in FIG. 11 and as described above, the upper-surface forming portion 611 of the fitting portion 6 is inserted into the region surrounded by the end surfaces 41a and 42a of the notch portion 4, and the lower-surface forming portion 612 is fitted to the steps 41W and 42W (see FIG. 5). The moving portion 7 is disposed with the guided slope 721 abutting on the guide slope 412u of the notch portion 4. Moreover, although not shown in the drawing, the movement of the fitting portion 6 (the fitting mechanism 5) in the +Y-direction is restricted in the fitted state with the projection 723 of the moving portion 7 abutting on the inclined surface 41Vc in the guide groove 41G of the notch portion 4, and thus the fitted state is maintained.

When the fitting portion 6 (the fitting mechanism 5) is pressed from the projection lens 3B side (Fd shown in FIG. 11) in the fitted state as shown in FIG. 11, the moving portions 7 on the left and right sides move toward each other with the guided slopes 721 sliding on the guide slopes 412u of the notch portion 4, and thus are brought into the retracted state. As a result, the fitting portion 6 is released from engagement with the notch portion 4 and brought into the released state. In this manner, the moving portion 7 engages with the notch portion 4 such that the moving portion 7 transitions to the retracted state against the biasing force of the coil spring 51 with pressure on the fitting portion 6 from the projection lens 3B side.

On the other hand, with respect to pressure to the projection lens 3B side (Fu shown in FIG. 11) in the fitted state, the fitted state of the fitting mechanism 5 (the fitting portion 6) is maintained because the lower-surface forming portion 612 is locked to the lower surfaces 412d and 42d (locking portion, see FIG. 7). Moreover, the fitting mechanism 5 (the fitting portion 6) has a tolerance that maintains the fitted state even when the user lifts the fitting mechanism 5 (the fitting portion 6) with fingers hooked thereon when moving the projector 1.

According to the configuration of the embodiment as has been described above, the following advantageous effects can be obtained.

(1) The fitting portion 6 is configured so as to move away from the projection lens 3B when pressed from the projection lens 3B side. With this configuration, even when the size of the opening 211 in the Z-direction (first direction) is set close to the movable region of the projection lens 3B where the projection lens 3B can move, it is possible to prevent the interposing of a foreign object. That is, in the case where a foreign object enters between the projection lens 3B and the fitting portion 6 when the projection lens 3B is moved in a direction approaching the fitting portion 6 from a distant position, even if the foreign object is interposed temporarily, the fitting portion 6 is pressed via the foreign object and moves away from the projection lens 3B. Therefore, the foreign object is not compressed, and it is possible to move the projection lens 3B. Thus, it is possible to reduce the size of the projector 1 in the Z-direction in which the projector can move an image to be projected, or to improve designability because a limitation on the size of the opening 211 is relaxed.

(2) The fitting mechanism 5 includes the moving portion 7 and the coil spring 51 in addition to the fitting portion 6. The moving portion 7 is configured such that the moving portion 7 projects from the fitting portion 6 by being biased by the coil spring 51 and can engage with the notch portion 4. Moreover, the moving portion 7 engages with the notch portion 4 so as to transition to the retracted state with pressure on the fitting portion 6 from the projection lens 3B side. With this configuration, it is possible with a simple configuration to realize the fitted state and the released state.

(3) Since the fitting portion 6 is supported at the left and right sides by the notch portion 4 via the moving portions 7, the fitting portion 6 can be highly precisely disposed into the notch portion 4 or can be moved with a stable pressing force. Thus, even with a configuration in which the peripheral edge of the opening 211 is formed of the front case 21 and the fitting portion 6, the peripheral edge of the opening 211 can be formed without impairing the external appearance, or a configuration in which the fitting portion 6 transitions from the fitted state to the released state with a stable pressing force is possible.

(4) Since the fitting portion 6 is detached from the front case 21 when pressed from the projection lens 3B side, it is possible to reliably prevent the interposing of a foreign object between the projection lens 3B and the fitting portion 6.

(5) The fitting portion 6 is fitted into the notch portion 4 by being slid in a direction from the side to which the projection lens 3B projects image light toward the projection lens 3B side in the released state. With this configuration, the fitting portion 6 can be easily fitted into the notch portion 4 without changing the attitude of the projector 1, that is, with the projector 1 remaining in the predetermined attitude.

Moreover, even when the distance between a placement surface on which the projector 1 is placed and the lower case is set to be small, that is, even when the protrusion amount of the leg portion from the lower case is reduced, the fitting portion 6 can be easily fitted into the notch portion 4 with the projector 1 remaining in the predetermined attitude. Thus, it is possible to further improve the designability of the projector 1.

(6) The front case 21 is provided with the lower surfaces 412d and 42d (locking portion) to which the fitting portion 6 is locked, and the fitted state of the fitting portion 6 is maintained even when the fitting portion 6 is pressed to the projection lens 3B side. Thus, even with a configuration in which the fitting portion 6 is disposed in a portion of the peripheral edge of the opening 211, it is possible to provide the projector 1 whose handling is not impaired.

(7) The projector 1 projects a landscape-oriented image in the predetermined attitude in which the projector 1 is placed on a desk or the like. The fitting portion 6 is provided below the projection lens 3B in the predetermined attitude. In the predetermined attitude, a location below the projection lens 3B is hard to see from the outside of the projector 1, and the fitting portion 6 is disposed at the hard-to-see location. With this configuration, the projection lens 3B can be moved downward without interposing a foreign object with no need to thoroughly check the location below the projection lens 3B. Thus, it is possible to provide the projector 1 that allows the user to readily operate the lens shift mechanism 3C.

The invention is not limited to the embodiment described above, and various modifications, improvements, or the like can be added to the embodiment described above. Modified examples will be described below.

Modified Example 1

The fitting mechanism 5 of the embodiment is configured so as to be detached from the notch portion 4 with pressure from the projection lens 3B side. However, the fitting mechanism 5 may be configured so as not to be detachable as long as at least the distal end moves away from the projection lens 3B.

Figure 12:
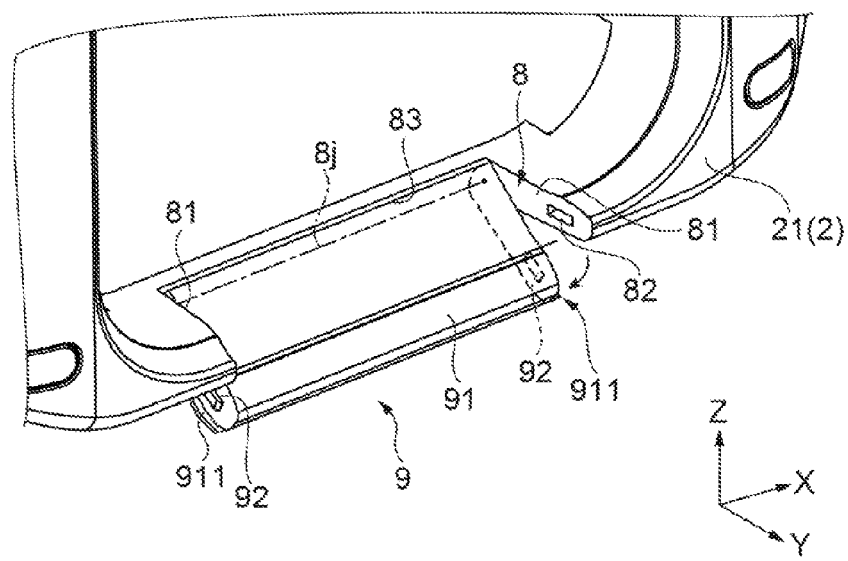
FIG. 12 is a schematic view showing a notch portion and a fitting mechanism in a modified example.

FIG. 12 is a schematic view showing a notch portion 8 and a fitting mechanism 9 in a modified example, showing the released state.

The notch portion 8 is provided with a central axis 8j extending in the X-direction (second direction) in which a pair of facing end portions 81 face each other and located close to an inner end portion 83. A recessed portion 82 is formed in each of the facing end portions 81.

The fitting mechanism 9 includes a fitting portion 91 that is pivoted to the notch portion 8 so as to be rotatable about the central axis 8j, moving portions 92 that project from the left and right end portions of the fitting portion 91, can move in the X-direction, and can engage with the recessed portions 82, and a biasing portion (not shown).

Projections 911 that project on the left and right sides are formed along a surface of the fitting portion 91 on the lower side.

When pressed from the projection lens 3B side in the fitted state, the fitting portion 91 rotates about the central axis 8j with the distal end side moving away from the projection lens 3B and thus is brought into the released state. Moreover, when pressed to the projection lens 3B side in the released state, the fitting portion 91 rotates about the central axis 8j with the moving portions 92 engaging with the recessed portions 82 and thus is brought into the fitted state. Moreover, even when the fitting portion 91 is further pressed to the projection lens 3B side in the fitted state, further rotation of the fitting portion 91 is restricted because the projections 911 are locked to the edge portions of the notch portion 8.

According to this modified example, the user can easily bring the fitting portion 91 into the fitted state by pressing the fitting portion 91 to the projection lens 3B side in the released state. Thus, it is possible to transition the fitting portion 91 from the released state to the fitted state with a simpler operation while realizing a configuration in which a foreign object is not interposed between the projection lens 3B and the fitting portion 91. Moreover, since the fitting portion 91 is not separated from the external housing 2 in the released state, it is possible to improve the handleability of the fitting portion 91 itself or to prevent the loss thereof.

Modified Example 2

The fitting mechanism 5 of the embodiment is configured such that the moving portion 7 and the coil spring 51 (biasing portion) are disposed in the fitting portion 6. However, a fitting mechanism including the moving portion and the biasing portion disposed in the external housing may be configured.

Modified Example 3

The notch portion 4 and the fitting mechanism 5 of the embodiment are provided below the projection lens 3B. However, the location is not limited to that below the projection lens 3B as long as the location is in the direction in which the projection lens 3B moves. The notch portion 4 and the fitting mechanism 5 may be provided above, on the left side, or on the right side of the projection lens 3B.

Moreover, a configuration including a plurality of notch portions and a plurality of fitting portions may be employed.

Modified Example 4

The fitting portion 6 and the front case 21 of the embodiment may be configured so as to be connected together with a string-like member.

Modified Example 5

In the embodiment, the coil spring 51 is used as a biasing portion. However, a leaf spring or the like may be configured as a biasing portion.

Modified Example 6

The lens shift mechanism 3C of the embodiment is configured such that the projection lens 3B can be moved in two directions orthogonal to the optical axis 3Bj. However, the lens shift mechanism 3C may be configured such that the projection lens 3B can be moved in one direction, for example, only in the X-direction or the Z-direction.

Modified Example 7

The projector 1 of the embodiment includes the lens shift mechanism 3C of electric type. However, the projector may be configured to include a manual type lens shift mechanism including an operating portion (e.g., a dial etc.) that can be operated by the user, in which the projection lens 3B is moved by operating the operating portion.

Modified Example 8

The projector 1 of the embodiment uses a transmissive liquid crystal panel as a light modulator. However, the projector may use a reflective liquid crystal panel. Moreover, a micromirror-type light modulator, for example, a digital micromirror device (DMD) or the like may be used as a light modulator.

Modified Example 9

The light source device 31 of the embodiment employs the light source 311 of discharge type. However, the light source device may be configured using other types of light sources or a solid-state light source such as a light emitting diode or a laser.

What is claimed is:
1. A projector comprising:
an image light generator that generates image light, the image light generator including a light source and a light modulator modulating light emitted from the light source;
a projection lens that projects the image light emitted from the image light generator;
a lens shift mechanism that moves the projection lens in a first direction crossing an optical axis of the projection lens;
an external housing including:
an opening surrounding the projection lens; and
a notch formed in a peripheral edge located on a first direction side of the opening; and
a fitting mechanism attached to the external housing, the fitting mechanism including:
a fitting portion fitted into the notch;
a biasing portion; and
a moving portion having:
a projected state where the moving portion projects from one of the notch and the fitting portion and can engage with the other of the notch and the fitting portion; and
a retracted state where the moving portion has a projection amount smaller than that in the projected state and is released from engagement,
wherein the moving portion is engaged by a biasing force of the biasing portion and transitions to the retracted state as a result of pressure on the fitting portion from a projection lens side.
2. The projector according to claim 1, wherein
the notch includes a pair of facing end portions facing each other in a state where fitting of the fitting portion is released,
the fitting portion includes a pair of side end portions respectively facing the pair of facing end portions in a state where the fitting portion is fitted into the notch,
a pair of the moving portions are provided so as to be able to respectively project from either the pair of facing end portions or the pair of side end portions, and
the biasing portion causes the pair of the moving portions to respectively project from the pair of side end portions.
3. The projector according to claim 2, wherein
the fitting portion is detached from the notch by being pressed from the projection lens side in the state where the fitting portion is fitted into the notch.
4. The projector according to claim 3, wherein
the fitting portion is fitted into the notch by being slid in a direction from a side to which the projection lens projects the image light toward the projection lens side in a state where the fitting portion is detached with respect to the external housing.
5. The projector according to claim 2, wherein
the notch includes a central axis extending in a second direction in which the pair of facing end portions face each other, and
the fitting portion is pivoted to the notch so as to be rotatable about the central axis.

6. The projector according to claim 1, wherein
the external housing includes a locking portion that locks the fitting portion in a direction toward the projection lens side in a state where the fitting portion is fitted into the notch.

7. The projector according to claim 1, wherein
the projector has a predetermined position in which the projector projects a rectangular image as a landscape-oriented image with a direction along a short side of the rectangular image being an up-down direction,
the first direction is the up-down direction in the predetermined position, and
the notch is formed below the projection lens in the predetermined position.

* * * * *